(12) United States Patent
Chapelle et al.

(10) Patent No.: US 11,828,249 B2
(45) Date of Patent: Nov. 28, 2023

(54) EXTERIOR NOZZLE MEMBER FOR A TURBOMACHINE

(71) Applicant: SAFRAN NACELLES, Gonfreville-l'Orcher (FR)

(72) Inventors: Olivier Chapelle, Moissy-Cramayel (FR); Dimitri Kostin, Moissy-Cramayel (FR); Clotaire Beauvais, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 8 days.

(21) Appl. No.: 17/636,832

(22) PCT Filed: Sep. 10, 2020

(86) PCT No.: PCT/EP2020/075418
§ 371 (c)(1),
(2) Date: Feb. 18, 2022

(87) PCT Pub. No.: WO2021/048323
PCT Pub. Date: Mar. 18, 2021

(65) Prior Publication Data
US 2022/0298990 A1    Sep. 22, 2022

(30) Foreign Application Priority Data
Sep. 13, 2019 (FR) ...................... 1910149

(51) Int. Cl.
*F02K 1/82* (2006.01)
*F02K 1/80* (2006.01)

(52) U.S. Cl.
CPC .............. *F02K 1/827* (2013.01); *F02K 1/805* (2013.01); *F05D 2230/60* (2013.01); *F05D 2240/55* (2013.01)

(58) Field of Classification Search
CPC . F02K 1/80; F02K 1/805; F02K 1/827; F01D 25/24; F01D 25/243; F01D 25/30;
(Continued)

(56) References Cited

U.S. PATENT DOCUMENTS

2009/0019857 A1*  1/2009 Tisdale ................ F02K 1/386
                                                         60/770
2012/0160933 A1*  6/2012 Vauchel ................ F02K 1/827
                                                         239/265.11
(Continued)

FOREIGN PATENT DOCUMENTS

FR       2873167 A1    1/2006
FR       2935753 A1    3/2010
FR       2949820 A1    3/2011

OTHER PUBLICATIONS

Search Report from the French Intellectual Property Office on corresponding FR application (FR1910149) dated May 19, 2020.
(Continued)

*Primary Examiner* — Elton K Wong
(74) *Attorney, Agent, or Firm* — KOS IP LAW LLP

(57) ABSTRACT

An exterior nozzle member for a turbomachine extending along an axis oriented from upstream to downstream and comprising a primary duct configured to conduct a primary flow, an annular cavity of axis and a turbine, said exterior nozzle member comprising: an acoustic attenuation panel formed by an acoustic attenuation structure on which there are mounted an interior wall and an exterior wall facing the primary duct and the annular cavity, respectively, a nozzle flange connected to the panel and comprising an upstream end configured to be connected to a turbine casing flange and a sealing member connected to the panel and comprising an interior longitudinal branch extending radially inside the nozzle flange in order to thermally protect it from the primary flow, the nozzle flange being made of a first material
(Continued)

and the sealing member being made of a second material, the first material having a coefficient of thermal expansion greater than that of the second material.

20 Claims, 6 Drawing Sheets

(58) Field of Classification Search
CPC . F01D 11/005; F05D 2230/60; F05D 2240/55
See application file for complete search history.

(56) References Cited

U.S. PATENT DOCUMENTS

| | | | | |
|---|---|---|---|---|
| 2013/0167505 A1* | 7/2013 | Gormley | ................. | F02K 1/805 |
| | | | | 277/634 |
| 2014/0158458 A1* | 6/2014 | Malot | ...................... | F02K 1/04 |
| | | | | 181/222 |
| 2020/0291891 A1* | 9/2020 | Aten | ......................... | F02K 1/76 |

OTHER PUBLICATIONS

International Search Report and Written Opinion on corresponding PCT application (PCT/EP2020/075418) from International Searching Authority (EPO) dated Dec. 2, 2020.

* cited by examiner

EXTERIOR NOZZLE MEMBER FOR A TURBOMACHINE

TECHNICAL FIELD

The present invention relates to the field of nozzles for turbomachines and is more particularly directed to an external nozzle member.

In a known manner, an aircraft comprises one or more turbomachines, in particular a turbojet engine T in the example of FIG. 1, longitudinally extending along an axis X and enabling the aircraft to be moved from an air flow F entering the turbojet engine T and circulating from upstream to downstream. Hereafter, the terms "upstream" and "downstream" are defined with respect to the axis X oriented from upstream to downstream. Similarly, the terms "internal" and "external" are defined along the radial direction with respect to the axis X.

In the example of FIG. 1 illustrating a dual flow turbojet engine T, the turbojet engine T comprises a radially internal primary stream V1 and a radially external secondary stream V2 with respect to the axis X, configured to conduct along the axis X respectively a radially internal part of the air flow F, known as the primary flow F1, and a radially external part of the air flow F, known as the secondary flow F2. The turbojet engine T also comprises an annular cavity 16 of axis X radially separating the primary stream V1 and the secondary stream V2.

In a known manner, still with reference to FIG. 1, the turbojet engine T comprises from upstream to downstream a fan 12 to compress and guide the air flow F towards the primary stream V1 and the secondary stream V2, a compressor 13 for compressing the primary flow F1, a gas combustion chamber 14 with the primary flow F1 for releasing the energy necessary for the rotation of the blades of the turbine 15 which in turn rotatably drives the compressor 13 and the fan 12. The turbine 15 comprises a turbine casing radially externally delimiting the primary stream V1.

In a known manner, still with reference to FIG. 1, an aircraft also comprises a nozzle 1 mounted to the turbine casing to guide the primary flow F1 out of the turbojet engine T. The nozzle 1 comprises an internal nozzle member 111 and an external nozzle member 110 extending peripherally around the axis X and respectively radially internally and radially externally delimiting the primary stream V1.

As illustrated in FIG. 2, the external nozzle member 110 comprises an acoustic attenuation panel 123 for the noise emitted by the ejection of the primary flow F1. In a known manner, the acoustic attenuation panel 123 comprises an acoustic attenuation structure 120, an internal wall 121, mounted to an internal face of the acoustic attenuation structure 120 and in contact with the primary flow F1, and an external wall 122, mounted to an external face of the acoustic attenuation structure 120. In a known manner, the acoustic attenuation structure 120 is in the form of a honeycomb structure. The internal wall 121 comprises a plurality of holes (not represented) to enable the circulation of the primary flow F1 in the acoustic attenuation structure 120, so as to attenuate the emitted acoustic waves.

With reference to FIGS. 2 and 3, to enable the external nozzle member 110 to be mounted to the turbine casing, the external nozzle member 110 comprises a nozzle flange 104 configured to be attached to a turbine casing flange 17 located downstream of the casing of the turbine 15. As illustrated in FIG. 3 representing a close-up view of FIG. 2, the nozzle flange 104 comprises a radial annular attachment branch 140 connected to a longitudinal branch 141 annular with respect to the axis X. The attachment branch 140 is located upstream of the longitudinal branch 141 as illustrated in FIG. 3. Similarly, the turbine casing flange 17 comprises a radial annular attachment branch 18, configured to be connected to the attachment branch 140 of the nozzle flange 104 by upstream attachment members 151, such as screw and nut assemblies by way of example, that is, bolting.

Still with reference to FIGS. 2 and 3, the external nozzle member 110 further comprises a sealing member 103, configured on the one hand to protect the acoustic attenuation structure 120, in particular its upstream part, and on the other hand to connect the nozzle flange 104 to the acoustic attenuation panel 123. During mounting, the longitudinal branch 141 of the nozzle flange 104 is aligned with the internal wall 121. The sealing member 103 is mounted externally to the longitudinal branch 141 of the nozzle flange 104 and to the internal wall 121 so as to seal their interface without disturbing flowing of the primary flow F1, as represented in FIG. 3. To attach the sealing member 103, its upstream end 131 is connected to the longitudinal branch 141 of the nozzle flange 104 by downstream attachment members 152 while its downstream end 132 is secured to the internal wall 121, to the acoustic attenuation structure 120 and to the external wall 122. In practice, the downstream end 132 of the sealing member 103 is in the form of a U-shaped piece brazed to the internal wall 121 and the external wall 122, as illustrated in FIG. 3.

During operation of the turbojet engine T, the primary flow F1 is ejected from the turbine 15 at a high temperature, in the order of 600° C., which heats the longitudinal branch 141 of the nozzle flange 104 as well as the internal wall 121. In order to enable cooling of the external nozzle member 110, a cooling air flow Fr at a low temperature, in the order of 300° C., circulates in the annular cavity 16 and comes into contact with the external wall 122, the sealing member 103 and a part of the nozzle flange 104.

In a known manner, the sealing member 103 and the nozzle flange 104 comprise a high-temperature resistant titanium alloy to ensure their mechanical and thermal strength during the operation of the turbojet engine T. However, as such a titanium alloy has a high cost, it has been provided to use a nozzle flange 104 made of lower cost alloys. For example, it has been provided to make a nozzle flange 104 of inconel, especially inconel 718 of the empirical formula NiCr19Fe19Nb5Mo3. Although inconel has very good mechanical and thermal strength, it has a coefficient of thermal expansion approximately 1.5 times higher than a titanium alloy. In practice, during the operation of the turbojet engine T, the nozzle flange 104 expands more than the sealing member 103. Such differential expansion increases the level of mechanical stress in the external nozzle member 110, which is undesirable.

The invention thus aims to eliminate at least some of the drawbacks associated with the use of a nozzle flange 104 made of an alloy having a different coefficient of thermal expansion.

Incidentally, for a nozzle flange of any material, it is known from patent application FR2949820A1 an external nozzle member the acoustic attenuation panel of which is connected by connecting means to a flange attached to the turbine upstream. The connecting means do not enable the flange to be thermally protected.

Furthermore, patent application FR2873167A1 teaches how to connect an external nozzle member to an aircraft turbine engine by two flanges.

SUMMARY

The invention relates to an external nozzle member for a turbomachine longitudinally extending along an axis X oriented from upstream to downstream, said turbomachine comprising at least one primary stream configured to conduct a primary flow from upstream to downstream and at least one annular cavity of axis X in which a cooling air flow circulates, said turbomachine comprising at least one turbine casing mounted along the axis X upstream of the external nozzle member and comprising at least one turbine casing flange extending downstream of the turbine casing, said external nozzle member being configured to radially externally delimit the primary stream with respect to the axis X at the outlet of the turbomachine, said external nozzle member comprising:

- at least one acoustic attenuation structure comprising an internal face and an external face,
- at least one internal wall mounted to the internal face of the acoustic attenuation structure and facing the primary stream and
- at least one external wall mounted to the external face of the acoustic attenuation structure and facing the annular cavity, said acoustic attenuation structure, said internal wall and said external wall forming an acoustic attenuation panel,
- at least one nozzle flange connected to the acoustic attenuation panel and comprising at least one upstream end configured to be connected to the turbine casing flange and
- at least one sealing member connected to the acoustic attenuation panel and comprising at least one internal longitudinal branch with respect to the axis X.

The invention is remarkable in that the internal longitudinal branch of the sealing member radially internally extends to the nozzle flange with respect to the axis X, so as to thermally protect said nozzle flange from the primary flow.

By virtue of the invention, the sealing member has a dual function, namely it ensures sealing of the attachment between the nozzle and the turbine and acts as a thermal barrier for the nozzle flange. This lowers the temperature of the nozzle flange, which reduces its expansion and thus improves its mechanical strength during use of the turbomachine.

According to one aspect of the invention, the nozzle flange is made of a first material and the sealing member is made of a second material, the first material having a higher coefficient of thermal expansion than the second material, preferably higher by at least 25%, more preferably higher by at most 75%. Advantageously, the nozzle flange has a generally lower temperature than the sealing member and a greater coefficient of thermal expansion than the sealing member, so that the nozzle flange and the sealing member expand comparably. This reduces the level of mechanical stress in the attachment between the external nozzle member and the turbine casing.

Preferably, the first material is inconel, preferentially inconel 718 of the empirical formula NiCr19Fe19Nb5Mo3, and the second material is a titanium alloy. Inconel advantageously has a higher mechanical strength than a titanium alloy and a lower cost.

According to one aspect of the invention, the sealing member and the nozzle flange are connected together to the acoustic attenuation panel, preferably by downstream attachment members, more preferably in the form of screw and nut assemblies. Such an attachment facilitates mounting and reduces relative movements between the sealing member and the nozzle flange.

According to another aspect of the invention, the internal longitudinal branch of the sealing member comprises at least one downstream portion radially internally mounted to the internal wall with respect to the axis X. Advantageously, the internal longitudinal branch performs a dual function, namely it protects the nozzle flange and provides attachment with the acoustic attenuation panel.

According to a preferred aspect, the internal longitudinal branch of the sealing member comprises at least one upstream portion extending in continuity with the internal wall upstream projecting, preferably to the axial position of the upstream end of the nozzle flange. The upstream wall thus forms a thermal barrier for the nozzle flange while defining the primary stream at the outlet of the turbomachine, which limits overall size, cost and facilitating mounting.

According to another preferred aspect, the internal wall upstream projectingly extends, preferably to the axial position of the upstream end of the nozzle flange. Such an internal wall provides an effective protection of the nozzle flange and increases the aerodynamics in the primary stream.

Preferentially, the internal longitudinal branch of the sealing member is separated from the turbine casing flange by a calibrated mounting clearance, so as to avoid generating contact wear during the use of the turbomachine.

According to one aspect of the invention, the sealing member comprises at least one external longitudinal branch radially internally mounted to the external wall with respect to the axis X and at least one radial branch connecting said external longitudinal branch and the internal longitudinal branch of the sealing member. Such a U-shaped sealing member enables easy rigid mounting to the acoustic attenuation panel by brazing to the internal wall and external wall.

According to one aspect of the invention, the upstream end of the nozzle flange is in the form of at least one attachment branch extending radially with respect to the axis X and configured to be connected to an attachment branch of the turbine casing flange, preferably by upstream attachment members, more preferably in the form of screw and nut assemblies. Such an attachment has a high mechanical strength while having a radial flexibility.

Preferably, the attachment branch of the nozzle flange comprises a scalloped edge, so as to provide flexibility in the attachment between the turbine casing flange and the nozzle flange as well as to reduce the on-board mass.

According to one aspect of the invention, the nozzle flange comprises at least one internal longitudinal branch connected to the upstream end, at least one external longitudinal branch and at least one radial branch connecting the internal longitudinal branch and the external longitudinal branch of the nozzle flange with respect to the axis X. The downstream end is thus U-shaped and can be easily integrated with the sealing member, while limiting the overall size.

According to a preferred aspect, the external longitudinal branch of the nozzle flange upstream projectingly extends from the radial branch of the nozzle flange, which enables easy mounting and easy access to the acoustic attenuation panel.

According to another preferred aspect, the external longitudinal branch of the nozzle flange downstream projectingly extends from the radial branch of the nozzle flange, which increases the radial flexibility of the attachment with the acoustic attenuation panel.

According to one aspect of the invention, the external longitudinal branch of the nozzle flange is connected to the external longitudinal branch of the sealing member. Such a connection is advantageously located close to the annular cavity where the cooling air flow circulates, which protects it from thermal expansion and provides it with better mechanical strength.

Preferentially, the external longitudinal branch of the nozzle flange comprises a scalloped edge so as to provide flexibility to the connection between the nozzle flange and the acoustic attenuation panel as well as to reduce the on-board mass.

Preferably, the internal longitudinal branch of the nozzle flange is separated from the internal longitudinal branch of the sealing member by a longitudinal air gap. Advantageously, the longitudinal air gap acts as a thermal insulator which reduces conduction heat transfer between the sealing member and the nozzle flange.

Preferably, the upstream portion of the internal longitudinal branch of the sealing member comprises a radial thickness less than or equal to that of the downstream portion. Such an upstream portion increases the radial thickness of the longitudinal air gap, which further reduces the heat exchanges between the sealing member and the nozzle flange, without increasing the overall size.

Preferably also, the radial branch of the nozzle flange is separated from the radial branch of the sealing member by a radial air gap. Advantageously, the radial air gap acts as a thermal insulator which reduces conduction heat transfers between the sealing member and the nozzle flange.

According to another aspect, the radial branch of the nozzle flange is connected to the radial branch of the sealing member, which enables easy mounting of the nozzle flange to the sealing member. Preferably, the nozzle flange does not comprise an external longitudinal branch, that is the nozzle flange only comprises an attachment branch, an internal longitudinal branch and a radial branch, to reduce mass, overall size and cost.

According to another aspect, the internal longitudinal branch of the nozzle flange is connected to the internal longitudinal branch of the sealing member, which enables easy mounting of the nozzle flange and the sealing member to the acoustic attenuation panel. Preferably, the nozzle flange does not comprise an external longitudinal branch and a radial branch, that is the nozzle flange only comprises an attachment branch and an internal longitudinal branch, to reduce mass, overall size and cost.

The invention also relates to an assembly of a turbomachine and of an external nozzle member as previously described, said turbomachine longitudinally extending along an axis X oriented from upstream to downstream, said turbomachine comprising at least one primary stream configured to conduct a primary flow from upstream to downstream and at least one annular cavity of axis X in which a cooling air flow circulates, said turbomachine comprising at least one turbine casing mounted along the axis X upstream of the external nozzle member and comprising at least one turbine casing flange extending downstream of the turbine casing and secured to the nozzle flange.

Preferably, the turbomachine is in the form of a turbojet engine, preferably for an aircraft.

Preferably, the internal longitudinal branch of the sealing member is separated from the turbine casing flange by a calibrated mounting clearance, preferably less than 2 mm. Such a calibrated mounting clearance enables the sealing member to achieve continuous thermal protection and avoid contact during operation of the turbomachine, which could lead to local wear.

The invention further relates to a method for mounting an assembly of a turbomachine and of an external nozzle member as previously described, said mounting method comprising:
- at least a first step of attaching the sealing member to the acoustic attenuation panel,
- at least a second step of attaching the nozzle flange to the acoustic attenuation panel so that the internal longitudinal branch of the sealing member radially internally extends to the nozzle flange with respect to the axis X, in order to thermally protect the nozzle flange from the primary flow, and
- at least a third step of attaching the upstream end of the nozzle flange to the turbine casing flange.

BRIEF DESCRIPTION OF THE DRAWINGS

The invention will be better understood from the following description, given only by way of example, and referring to the appended drawings given as non-limiting examples, in which identical references are given to similar objects and in which.

It should be noted that the figures set out the invention in detail to implement the invention, said figures of course being able to serve to better define the invention if necessary.

DETAILED DESCRIPTION

Figure 1:
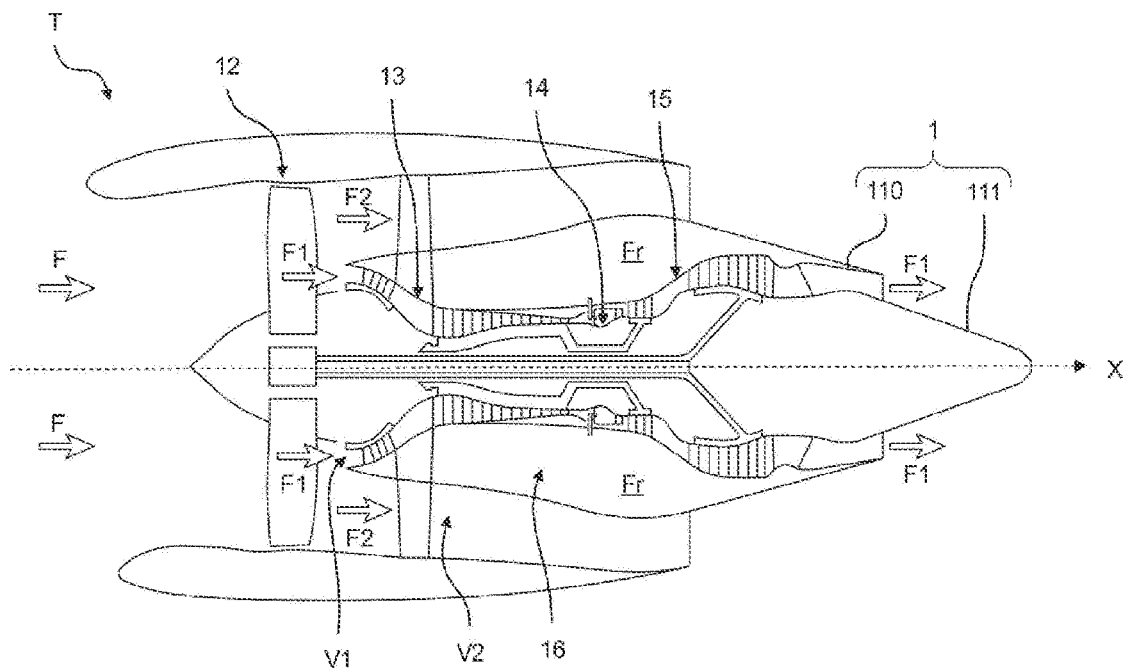
FIG. 1 is a schematic representation in a longitudinal cross-section view of an aircraft turbojet engine according to prior art.
Figure 2:
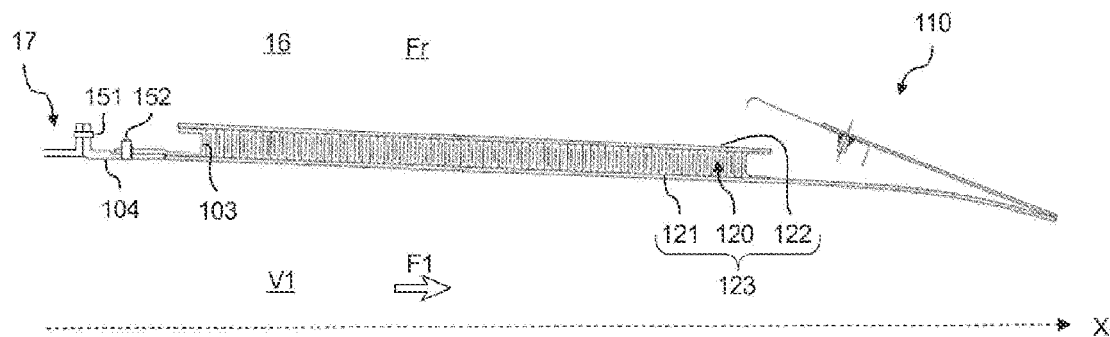
FIG. 2 is a schematic representation in a longitudinal half cross-section view of an external nozzle member attached to an aircraft turbojet engine turbine casing according to prior art.
Figure 3:
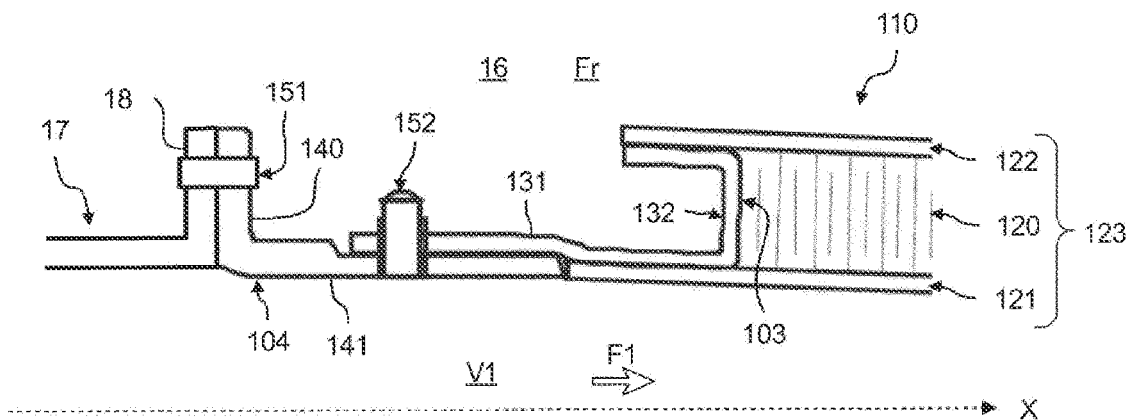
FIG. 3 is a schematic representation in a close-up longitudinal half cross-section view of FIG. 2 of a nozzle flange and a sealing member of the external nozzle member according to prior art.
Figure 4:
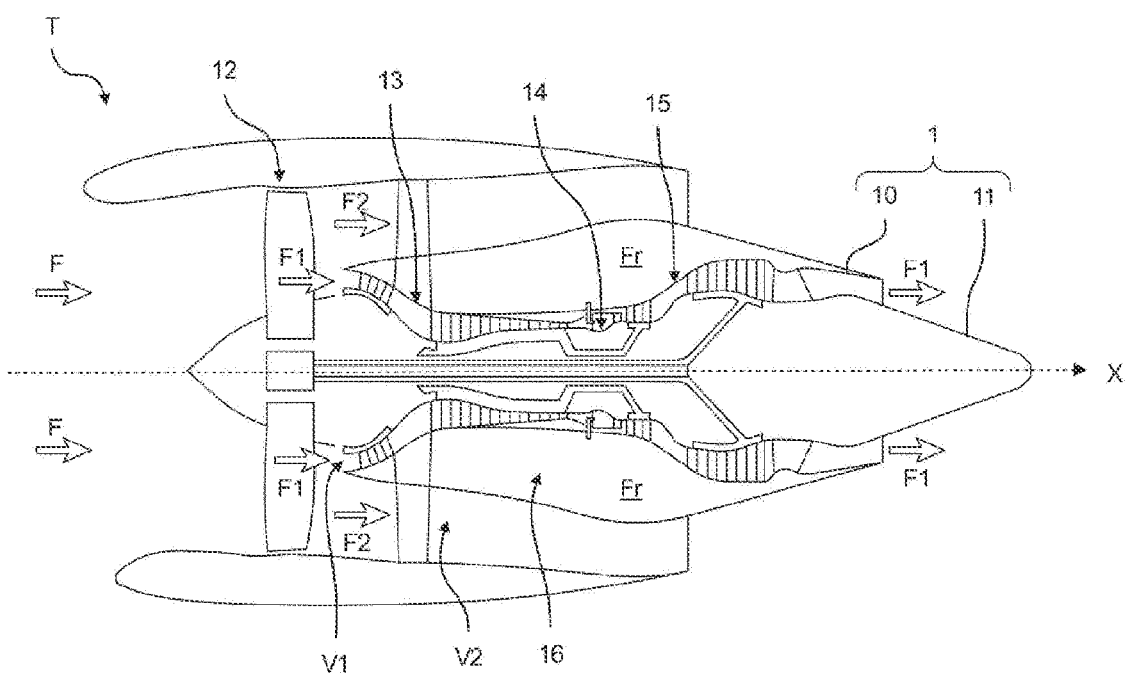
FIG. 4 is a schematic representation in a longitudinal cross-section view of an aircraft turbojet engine according to the invention.

With reference to FIG. 4, as already set forth in the preamble, an aircraft dual flow turbojet engine T is represented longitudinally extending along an axis X and enabling the aircraft to be moved from an air flow F entering the turbojet engine T and circulating from upstream to downstream. Hereafter, adjectives "longitudinal" and "radial" are used to qualify an object comprising at least one longitudinal component and at least one radial component respectively with respect to the axis X. The terms "upstream" and "downstream" are defined with respect to the axis X oriented from upstream to downstream. Similarly, the terms "internal" and "external" are defined along the radial direction with respect to the axis X.

As illustrated in FIG. 4, the aircraft turbojet engine T comprises a radially internal primary stream V1 and a radially external secondary stream V2 with respect to the axis X, configured to conduct along the axis X respectively a radially internal part of the air flow F, known as the primary flow F1, and a radially external part of the air flow F, known as the secondary flow F2.

Still with reference to FIG. 4, the turbojet engine T comprises, from upstream to downstream, a fan 12 to compress and guide the air flow F towards the primary stream V1 and the secondary stream V2, a compressor 13 for compressing the primary flow F1, a gas combustion chamber 14 with the primary flow F1 for releasing the energy necessary for the rotation of the blades of a turbine 15, which in turn rotatably drives the compressor 13 and the fan 12. The turbine 15 comprises a turbine casing radially externally delimiting the primary stream V1.

Still with reference to FIG. 4, an aircraft also comprises a nozzle 1, mounted to the turbine casing downstream of the turbine 15, to guide the primary flow F1 out of the turbojet engine T. The nozzle 1 comprises an internal nozzle member 11 and an external nozzle member 10 extending peripherally around the axis X and respectively radially internally and radially externally delimiting the primary stream V1 at the outlet of the turbojet engine T. The turbojet engine T also comprises an annular cavity 16 of axis X radially separating the primary stream V1 and the secondary stream V2, in which a cooling air flow Fr of the turbojet engine T, in particular of the compressor 13, circulates. The external nozzle member 10 thus forms an internal wall of the annular cavity 16.

Figure 5:
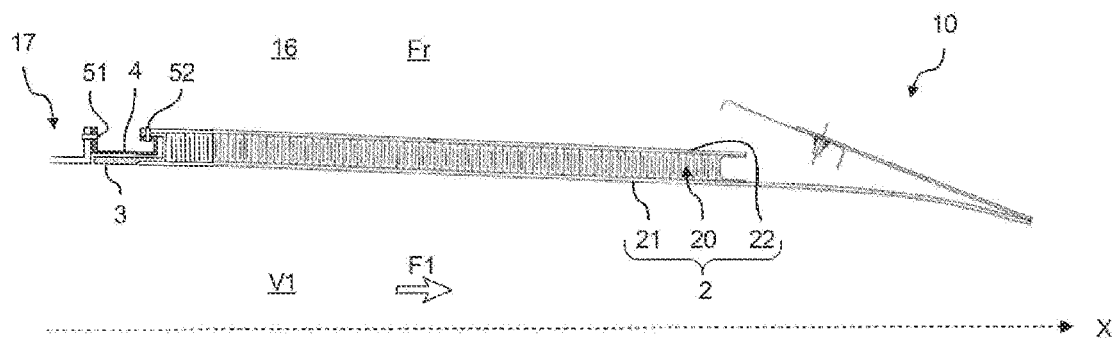
FIG. 5 is a schematic representation in a longitudinal half cross-section view of an external nozzle member attached to an aircraft turbojet engine turbine casing according to the invention.
Figure 6:
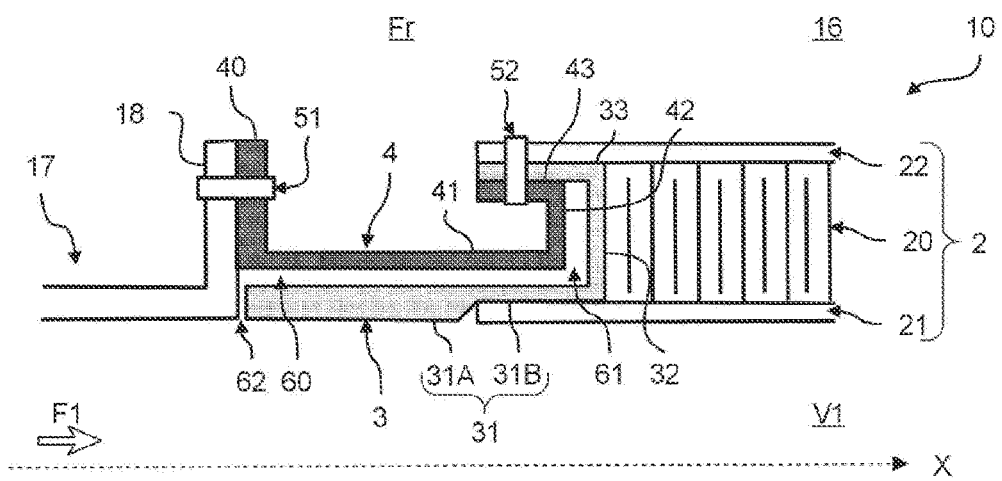
FIG. 6 is a schematic representation in a close-up longitudinal half cross-section view of FIG. 5 of a nozzle flange and a sealing member of the external nozzle member according to the invention.

With reference to FIGS. 5 and 6, FIG. 6 representing a close-up view of FIG. 5, the external nozzle member 10 comprises an acoustic attenuation structure 20 for the noise emitted by the ejection of the primary flow F1, in the form of a honeycomb structure and comprising an internal face and an external face. The external nozzle member 10 also comprises an internal wall 21 mounted to the internal face of the acoustic attenuation structure 20 and facing the primary stream V1 and an external wall 22 mounted to the external face of the acoustic attenuation structure 20 and facing the annular cavity 16. The internal wall 21 comprises a plurality of holes (not represented) to enable the circulation of the primary flow F1 in the acoustic attenuation structure 20, so as to attenuate the acoustic waves emitted during the ejection of the primary flow F1. Hereafter, the assembly formed by the acoustic attenuation structure 20, the internal wall 21 and the external wall 22 is referred to as the "acoustic attenuation panel 2". The acoustic attenuation panel 2 is peripheral with axis X.

According to the invention, still with reference to FIGS. 5 and 6, the external nozzle member 10 comprises a nozzle flange 4 and a sealing member 3 configured to cooperate to enable the external nozzle member 10 to be mounted to the turbine casing and more precisely to a turbine casing flange 17 extending downstream of the turbine casing. The nozzle flange 4 and the sealing member 3 are positioned upstream of the acoustic attenuation panel 2. The nozzle flange 4 and the sealing member 3 are peripheral pieces of axis X. The nozzle flange 4 is connected to the acoustic attenuation panel 2 and comprises an upstream end configured to be connected to the turbine casing flange 17. The sealing member 3 is in turn connected to the acoustic attenuation panel 2, on the one hand to protect the acoustic attenuation structure 20, in particular, its upstream part, and on the other hand to seal the attachment between the external nozzle member 10 and the turbine casing, so that the primary flow F1 does not come into contact with the cooling air flow Fr.

In this embodiment, the sealing member 3 comprises a titanium alloy with high mechanical and thermal strength, while the nozzle flange 4 comprises inconel, especially inconel 718 of the empirical formula NiCr19Fe19Nb5Mo3. Advantageously inconel has a high mechanical strength and low cost, but also a coefficient of thermal expansion approximately 1.5 times higher than the sealing member 3. However, it goes without saying that the nozzle flange 4 and/or the sealing member 3 could comprise another material. In particular, the nozzle flange 4 could comprise another material with a higher coefficient of thermal expansion than the sealing member 3.

As illustrated in FIGS. 6 and 8 to 12, according to the invention, the sealing member 3 comprises an internal longitudinal branch 31 which radially internally extends to the nozzle flange 4 with respect to the axis X in order to thermally protect the nozzle flange 4 from the primary flow F1, the temperature of which is in the order of 600° C. The internal longitudinal branch 31 of the sealing member 3 thus acts as a thermal barrier preventing the nozzle flange 4 from being in direct contact with the primary flow F1. This has the advantage of limiting heat transfers between the high-temperature primary flow F1 and the nozzle flange 4, and thus of limiting the thermal expansion of said nozzle flange 4. The nozzle flange 4 thus has a better mechanical strength.

As previously set forth, the nozzle flange 4 has a higher coefficient of thermal expansion than the sealing member 3. By virtue of the invention, the nozzle flange 4 is thermally protected from the primary flow F1 by the sealing member 3, the temperature of the sealing member 3 is generally higher than that of the nozzle flange 4 so that the nozzle flange 4 and the sealing member 3 expand comparably.

Preferably, the sealing member 3 extends peripherally around the axis X, so as to ensure a mounting of optimum mechanical strength. The same applies to the nozzle flange 4 and the turbine casing flange 17. Preferentially, a sealing member 3 and/or a nozzle flange 4 and/or a turbine casing flange 17 have a one-piece structure for optimum mechanical strength. Nevertheless, it goes without saying that each element could be formed of angular sectors.

The structural and functional aspects of the sealing member 3 and the nozzle flange 4 are described in more detail below with reference to FIG. 6 illustrating a first embodiment of the invention.

As illustrated in FIG. 6, the sealing member 3 is in the form of a U-shaped piece the concavity of which faces upstream. More precisely, the sealing member 3 comprises an internal longitudinal branch 31 and an external longitudinal branch 33 connected by a radial branch 32. In this example, the sealing member 3 is connected to the acoustic attenuation panel 2, in particular by brazing. The internal longitudinal branch 31 is radially externally connected to the internal wall 21 and the external longitudinal branch 33 is connected radially internally to the external wall 22. The radial branch 32 is connected to a side wall of the acoustic attenuation structure 20. Preferably, the external longitudinal branch 33 of the sealing member 3 is in contact with the external wall 22 over its entire longitudinal length, in order to limit the overall size.

In the example of FIG. 6, the internal longitudinal branch 31 comprises a downstream portion 31B radially external to the internal wall 21 and an upstream portion 31A upstream projectingly extending. The upstream portion 31A extends in continuity with the internal wall 21, so as to thermally protect the nozzle flange 4 from the primary flow F1. In other words, the upstream portion 31A radially externally delimits the primary stream V1 between the turbine casing flange 17 and the internal wall 21 and forms a barrier to avoid contact between the primary flow F1 and the nozzle flange 4. In this example, the upstream end of the internal longitudinal branch 31 is located in the immediate vicinity of the turbine casing flange 17 as illustrated in FIG. 6, these being separated by a calibrated mounting clearance 62, preferably less than 2 mm. Such a calibrated mounting clearance 62 avoids any contact during operation of the turbojet engine T under the effect of mechanical stresses. Such contact could lead to wear on the turbine casing flange 17 or on the sealing member 3, known to the skilled person as "fretting", which is not desirable.

As illustrated in FIG. 6, the external longitudinal branch 33 of the sealing member 3 and the external wall 22 of the acoustic attenuation panel 2 are connected by downstream attachment members 52, in this example in the form of screw and nut assemblies, that is, bolting. More precisely, the external longitudinal branch 33 and the external wall 22 each comprise holes configured to receive the downstream attachment members 52. After mounting, the downstream attachment members 52 extend radially with respect to the axis X, that is perpendicularly to the external longitudinal branch and the external wall 22 to limit attachment clearance. It goes without saying that the downstream attachment members 52 could be in any other form. Such downstream attachment members 52 advantageously secure the sealing member 3 and the acoustic attenuation panel 2. The sealing member 3 thus sealingly separates the primary stream V1 and the annular cavity 16, so as to avoid any mixture between the primary flow F1 and the cooling air flow Fr. Preferably, the downstream attachment members 52 comprise steel or inconel.

As illustrated in FIG. 6, the nozzle flange 4 comprises on the one hand an upstream end configured to be connected to the turbine casing flange 17 and on the other hand a downstream end connected to the acoustic attenuation panel 2. Furthermore, the nozzle flange 4 is mounted so that the sealing member 3 faces the annular cavity 16 where the cooling air flow Fr circulates. The sealing member 3 is thus in contact with the cooling air flow Fr the temperature of which is in the order of 300° C. but protected from the primary flow F1 the temperature of which is in the order of 600° C., which limits its thermal expansion.

Figure 7A:
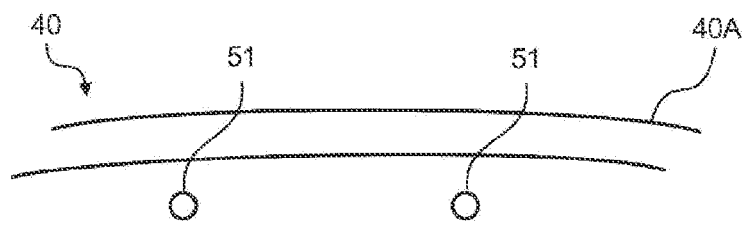
FIG. 7A and
FIG. 7B are schematic perspective representations of the attachment branch of the nozzle flange according to two embodiments of the invention and FIG. 8,
FIG. 9,
FIG. 10,
FIG. 11,
FIG. 12 and
FIG. 13 are schematic representations in a longitudinal half cross-section view of a nozzle flange and a sealing member according to a first, second, third, fourth, fifth and sixth alternative embodiments of the invention respectively.
Figure 7B:
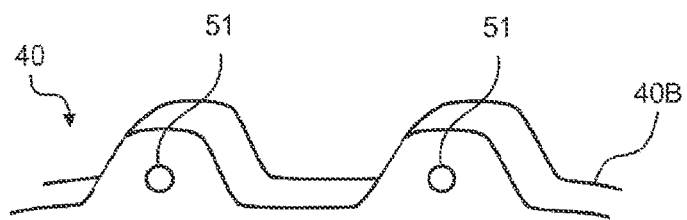

In the example of FIG. 6, the upstream end of the nozzle flange 4 is in the form of an attachment branch 40 extending radially with respect to the axis X and configured to be connected to an attachment branch 18 of the turbine casing flange 17, also extending radially with respect to the axis X and connected to a longitudinal branch of the turbine casing flange 17. More precisely, as illustrated in FIGS. 6, 7A and 7B, the attachment branch 40 of the nozzle flange 4 and the attachment branch 18 of the turbine casing flange 17 are configured to be connected by upstream attachment members 51, in this example in the form of screw and nut assemblies mounted in holes. After mounting, the upstream attachment members 51 extend longitudinally with respect to the axis X, that is perpendicularly to the attachment branches 40, 18 to limit attachment clearance. Preferentially, the upstream attachment members 51 comprise steel or inconel. It goes without saying that the upstream attachment members 51 could be in another form. Furthermore, it goes without saying that the upstream end could be in another form, in particular configured to cooperate with a turbine casing flange 17 of any shape.

Preferably, as illustrated in FIG. 7B, the attachment branch 40 of the nozzle flange 4 comprises a scalloped edge 40B, so as to reduce the on-board mass of the aircraft 20. However, it goes without saying that the attachment branch 40 could comprise a straight edge 40A, as represented in FIG. 7A.

As illustrated in FIG. 6, the nozzle flange 4 comprises an internal longitudinal branch 41 connected to the attachment branch 40, an external longitudinal branch 43 and a radial branch 42 connecting the internal longitudinal branch 41 and the external longitudinal branch 43. The internal longitudinal branch 41, the radial branch 42 and the external longitudinal branch 43 together form the downstream end of the nozzle flange 4.

In the example of FIG. 6, the external longitudinal branch 43 of the nozzle flange 4 is radially internally mounted to the external longitudinal branch 33 of the sealing member 3 and connected to the external wall 22 by the downstream attachment members 52. The attachment between the nozzle flange 4 and the acoustic attenuation panel 2 is thus achieved between the external longitudinal branch 43 and the external wall 22, which are advantageously subjected to lower temperatures than those of the primary flow F1 by virtue of the circulation of the cooling air flow Fr, thus reducing the level of mechanical stress in the external nozzle member 10. Moreover, the downstream attachment members 52 advantageously connect both the nozzle flange 4 and the sealing member 3 to the external wall 22, which limits the overall size and improves sealing. However, it goes without saying that the nozzle flange 4 and the sealing member 3 could be connected separately to the acoustic attenuation panel 2. Furthermore, similarly to the attachment branch 40 in FIG. 7B, the external longitudinal branch 43 preferably comprises a scalloped edge, so as to reduce the on-board mass of the aircraft. The same applies to the external longitudinal branch 33 of the sealing member 3 and/or to the external wall 22.

Still in the example of FIG. 6, the external longitudinal branch 43 axially extends upstream projecting from the radial branch 42. In other words, the downstream end of the nozzle flange 4 has a shape similar to that of the sealing member 3. Advantageously, such a shape enables easy mounting of the downstream attachment members 52.

Still in the example of FIG. 6, the internal longitudinal branch 41 of the nozzle flange 4 is separated from the internal longitudinal branch 31 of the sealing member 3 by a longitudinal air gap 60. Advantageously, such a longitudinal air gap 60 avoids any conductive exchange between the internal longitudinal branch 41 of the nozzle flange 4 and the internal longitudinal branch 31 of the sealing member 3, which is in contact with the primary flow F1 and therefore has a high temperature. The internal longitudinal branch 41 is also subjected to convective exchanges with the cooling air flow Fr. The presence of a longitudinal air gap 60 makes it possible to form a thermal insulation volume between the primary flow F1 and the cooling air flow Fr, with a temperature close to that of the primary flow F1.

Advantageously, this makes it possible to maintain the internal longitudinal branch 41 at a temperature in the order of 450° C., which makes it possible to reduce the expansion of the nozzle flange 4. Preferably, the longitudinal air gap 60 has a radial thickness of between 1 mm and 20 mm, large enough to avoid any contact between the internal longitudinal branches 31, 41 during operation of the turbojet engine T under the effect of mechanical stresses, and small enough to limit the overall size.

Similarly, the radial branch 42 of the nozzle flange 4 is separated from the radial branch 32 of the sealing member 3 by a radial air gap 61, which is fluidly connected to the longitudinal air gap 60. Advantageously, such a radial air gap 61 associated with the longitudinal air gap 60 limits contact and therefore conductive exchanges between the nozzle flange 4 and the sealing member 3, to those at the downstream attachment members 52. The nozzle flange 4 is thus advantageously effectively protected from high temperatures by the sealing member 3. Preferably, the radial air gap 61 has a longitudinal thickness of between 1 mm and 20 mm, large enough to avoid any contact between the radial branches 32, 12 during operation of the turbojet engine T under the effect of the induced assembling and expansion clearances, and small enough to limit the overall size.

Alternative embodiments of the invention are described below with reference to FIGS. 8 to 13, highlighting the structural and functional differences from the embodiment previously set forth. It goes without saying that the invention is not limited to the embodiments described herein, but encompasses any possible combination of the embodiments set forth. Furthermore, all of the embodiments described relate to an external nozzle member 10 for an aircraft turbojet engine T. However, it goes without saying that it could be an external nozzle member 10 for any turbomachine.

Figure 8:
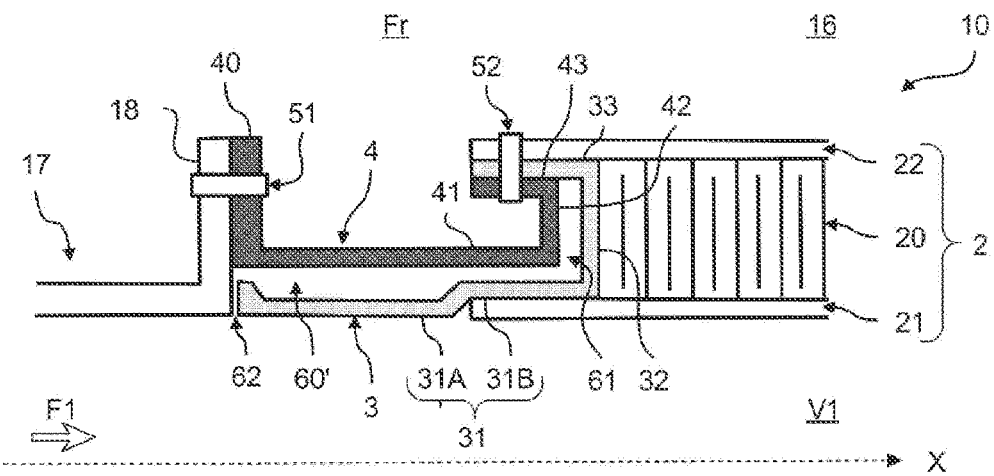

In the example of FIG. 8 illustrating a first alternative embodiment, the internal longitudinal branch 31 of the sealing member 3 comprises an upstream portion 31A' of reduced thickness, that is which comprises a radial thickness less than or equal to that of the downstream portion 31B. Advantageously, such a reduced upstream portion 31A' increases the radial thickness of the longitudinal air gap 60 and therefore insulation without increasing the overall size. Preferably, the upstream portion 31A' comprises an upstream edge having an extra thickness, so as to avoid the circulation of a large primary flow F1 in the longitudinal air gap 60. The upstream portion 31A' and the downstream portion 31B are thus radially offset.

Figure 9:
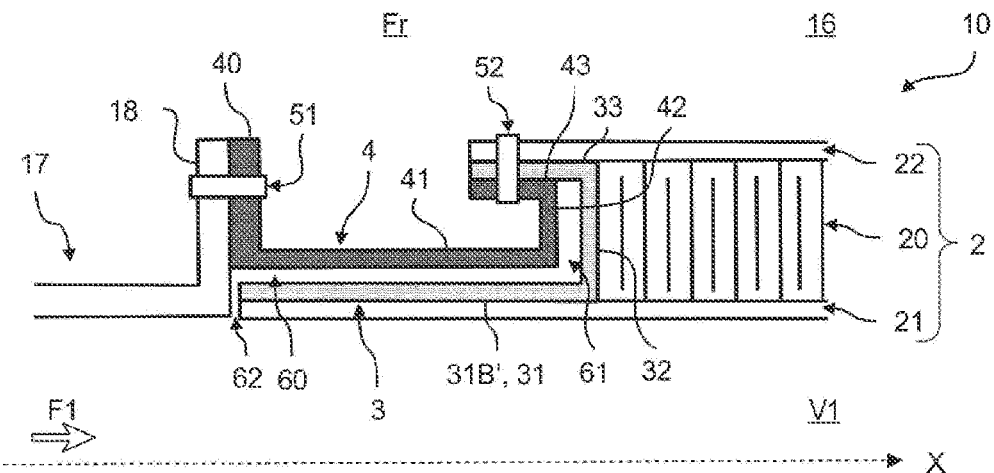

In the example of FIG. 9 illustrating a second alternative embodiment, the internal wall 21 longitudinally extends upstream projecting, so that the turbine casing flange 17 and the internal wall 21 are only separated by a calibrated mounting clearance. The sealing member 3 is thus radially external to the internal wall 21. The internal longitudinal branch 31 is mounted in contact with the internal wall 21 over its entire longitudinal length. Advantageously, such an internal wall 21 enables a more aerodynamic flowing of the primary flow F1.

Figure 10:
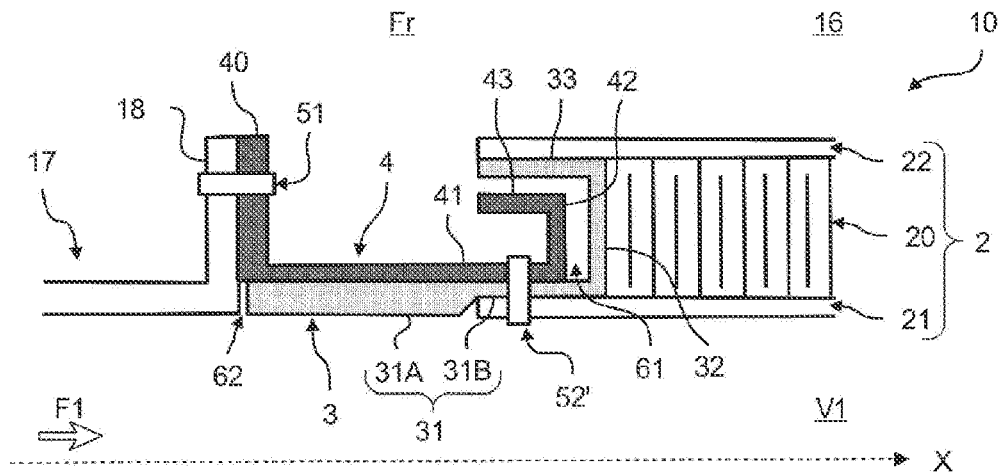

In the example of FIG. 10 illustrating a third alternative embodiment, the sealing member 3 and the nozzle flange 4 are connected to the internal wall 21 of the acoustic attenuation panel 2. More precisely, the downstream attachment members 52' connect the internal longitudinal branch 31 of the sealing member 3, the internal longitudinal branch 41 of the nozzle flange 4 and the internal wall 21. Such a connection between the sealing member 3, the nozzle flange 4 and the acoustic attenuation panel 2 has the advantage of being easy to mount. Furthermore, in this third embodiment, the nozzle flange 4 may not comprise an external longitudinal branch 43 and a radial branch 42, that is the nozzle flange 4 would only comprise an attachment branch 40 and an internal longitudinal branch 41, and this in order to reduce mass, overall size and cost.

Figure 11:
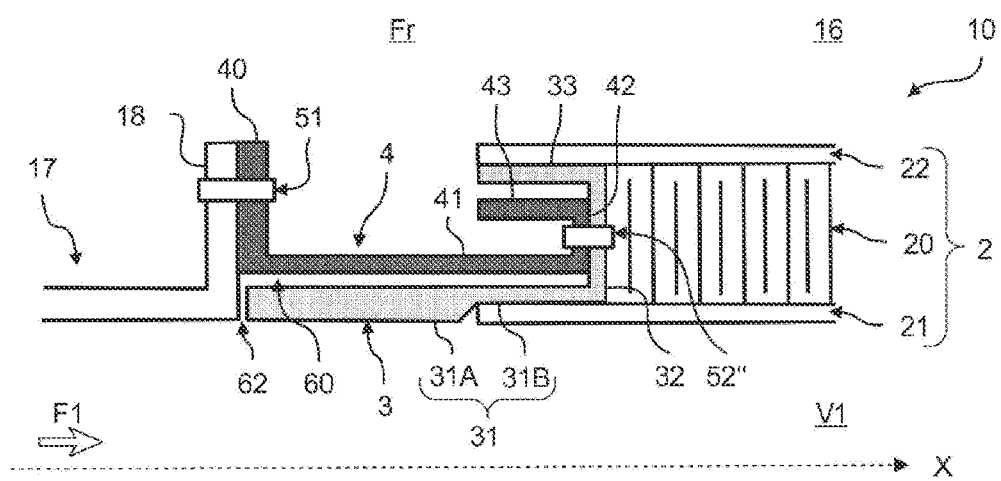

In the example of FIG. 11 illustrating a fourth alternative embodiment, the sealing member 3 and the nozzle flange 4 are connected to a radial face of the acoustic attenuation structure 20 of the acoustic attenuation panel 2. In particular, the downstream attachment members 52" connect the radial branch 32 of the sealing member 3, the radial branch 42 of the nozzle flange 4 and the acoustic attenuation structure 20. Such a connection between the sealing member 3, the nozzle flange 4 and the acoustic attenuation panel 2 has the advantage of being easy to mount. Furthermore, in this fourth embodiment, the nozzle flange 4 may not comprise an external longitudinal branch 43, that is the nozzle flange 4 would only comprise an attachment branch 40, an internal longitudinal branch 41 and a radial branch 42, and this in order to reduce mass, overall size and cost.

Figure 12:
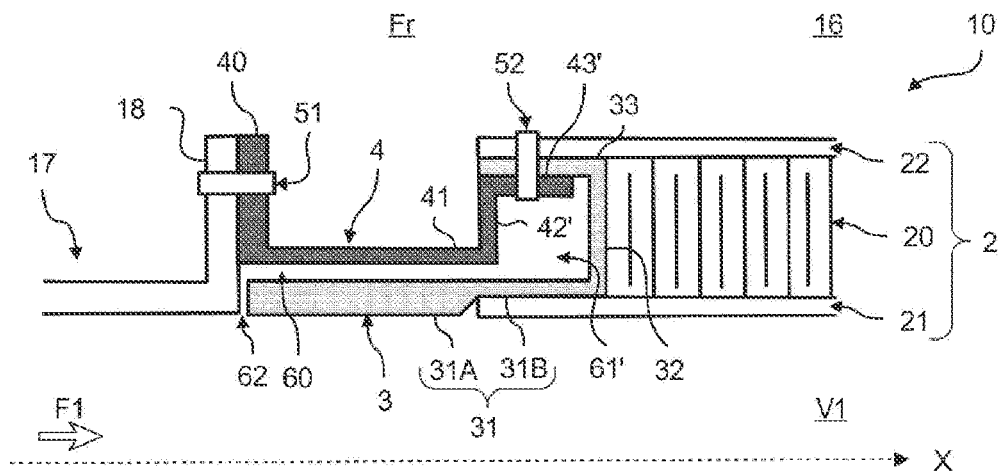

In the example of FIG. 12 illustrating a fifth alternative embodiment, the sealing member 3 and the nozzle flange 4 are connected to the external wall 22 of the acoustic attenuation panel 2, as in the first embodiment illustrated in FIG. 6. The external longitudinal branch 43' of the nozzle flange 4 axially extends downstream projecting from the radial branch 42' and not upstream as illustrated in FIG. 6. In other words, the downstream end of the nozzle flange 4 is in the form of a stepped or Z-shaped structure and not a U-shaped structure with the concavity facing upstream, as described for the embodiment in FIG. 6. Advantageously, such an external longitudinal branch 43' enables a more flexible connection at the downstream attachment members 52. In particular, such a connection has a greater radial flexibility, which enables a greater thermal expansion discrepancy between the nozzle flange 4 and the acoustic attenuation panel 2. Similarly to FIG. 12, the external longitudinal branch 43' of the nozzle flange 4 is connected to the external longitudinal branch 33 of the sealing member 3 and to the external wall 22 by the downstream attachment members 52.

Figure 13:
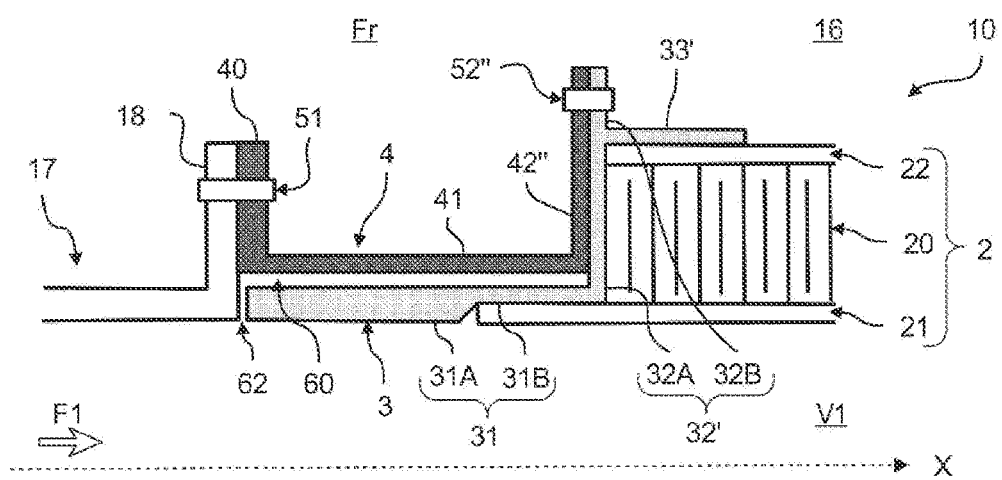

In the example of FIG. 13 illustrating a sixth alternative embodiment, the sealing member 3 and the nozzle flange 4 are connected to each other radially, as in the fourth alternative embodiment illustrated in FIG. 11. However, in contrast to the example of FIG. 11, the acoustic attenuation panel 2 is not connected to the sealing member 3 and the nozzle flange 4 by the downstream attachment members 52". More precisely, the external longitudinal branch 33' of the sealing member 3 radially externally extends in contact with the external wall 22 and the radial branch 32' of the sealing member extends projecting from said external longitudinal branch 33'. In other words, the radial branch 32' comprises a radially internal portion 32A and a radially external portion 32B with respect to the external longitudinal branch 33' of the sealing member 3. The downstream attachment members 52" in turn connect the radial branch 32' of the sealing member 3 and the radial branch 42" of the nozzle flange 4 at the radially external portion 32B. Such downstream attachment members 52" advantageously have a good mechanical strength, being located in the annular cavity 16 where the cooling air flow Fr circulates. Preferably, the nozzle flange 4 does not comprise an external longitudinal branch 43 in this embodiment, to limit the overall size.

Hereinafter it is described a method for mounting the assembly of an aircraft turbojet engine T and an external nozzle member 10, as described above. According to the invention, such a mounting method comprises three successive attachment steps which are detailed below.

In a first attachment step, the sealing member 3 is connected to the acoustic attenuation panel 2. In practice, the sealing member 3 is brazed to the internal wall 21 and the external wall 22. At the end of the first attachment step, the internal longitudinal branch 31 of the sealing member 3 is radially internally mounted to the internal wall 21, the external longitudinal branch 33 is radially internally mounted to the external wall 22 and the radial branch 32 is in contact with the acoustic attenuation structure 20.

In a second attachment step, the nozzle flange 4 is radially externally connected to the acoustic attenuation panel 2 to the internal longitudinal branch 31 of the sealing member 3. For this purpose, the downstream end of the nozzle flange 4 is connected together with the sealing member 3 to the acoustic attenuation panel 2 by means of the downstream attachment members 52. At the end of the second attachment step, the downstream attachment members 52 hold the acoustic attenuation panel 2, the sealing member 3 and the nozzle flange 4 integral with each other.

In a third attachment step, the nozzle flange 4 is connected to the turbine casing flange 17. More precisely, the upstream end of the nozzle flange 4 is connected to the turbine casing flange 17 by upstream attachment members 51. After the third attachment step, the external nozzle member 10 is integral with the turbine casing.

By virtue of the invention, an alloy with a lower cost and a greater coefficient of thermal expansion than a high-temperature resistant titanium alloy can be used to make the nozzle flange 4, without affecting the connection between the external nozzle member 10 and the turbine casing. For this purpose, the internal longitudinal branch 31 of the sealing member 3 is advantageously radially internally mounted to the nozzle flange 4, thermally protecting it from the primary flow F1. The nozzle flange 4 is thus subjected to a lower temperature than that of the sealing member 3, which limits the differential expansion between said nozzle flange 4 and the sealing member 3. The level of mechanical stress observed at the connection is therefore greatly reduced. The invention also makes it possible, depending on the embodiments, to improve the aerodynamics of the primary stream V1 and to increase the flexibility of the connection between the external nozzle member 10 and the turbine casing.

The invention claimed is:

1. An external nozzle member for a turbomachine that extends longitudinally along an axis oriented from upstream to downstream, said turbomachine comprising at least one primary stream configured to conduct a primary flow from upstream to downstream, at least one annular cavity in which a cooling air flow circulates, and at least one turbine casing mounted along the axis upstream of the external nozzle member and comprising at least one turbine casing flange, said external nozzle member being configured so as to radially externally delimit the at least one primary stream with respect to the axis at an outlet of the turbomachine, said external nozzle member comprising:
    at least one acoustic attenuation structure comprising an internal face and an external face defining an acoustic attenuation panel,
    at least one internal wall mounted to the internal face of the at least one acoustic attenuation structure and facing the at least one primary stream,
    at least one external wall mounted to the external face of the at least one acoustic attenuation structure and facing the annular cavity,
    at least one nozzle flange connected to the acoustic attenuation panel and comprising at least one upstream end configured to be connected to the at least one turbine casing flange,
    at least one sealing member connected to the acoustic attenuation panel and comprising at least one internal longitudinal branch,
    wherein the at least one internal longitudinal branch of the at least one sealing member extends, with respect to the axis, to the at least one nozzle flange so as to thermally protect said at least one nozzle flange from the primary flow, the at least one nozzle flange being made of a first material and the at least one sealing member being made of a second material, and wherein the first material has a coefficient of thermal expansion that is higher than a coefficient of thermal expansion of the second material.

2. The external nozzle member according to claim 1, wherein the first material has a higher coefficient of thermal expansion than the second material by at least 25%.

3. The external nozzle member according to claim 1, wherein the at least one sealing member and the at least one nozzle flange are connected together to the acoustic attenuation panel.

4. The external nozzle member according to claim 1, wherein the at least one internal longitudinal branch of the at least one sealing member comprises at least one downstream portion that extends radially relative to the axis and is mounted to the internal wall.

5. The external nozzle member according to claim 4, wherein the at least one internal longitudinal branch of the at least one sealing member comprises at least one upstream portion.

6. The external nozzle member according to claim 4, wherein the internal wall extends upstream.

7. The external nozzle member according to claim 1, wherein the at least one sealing member comprises at least one external longitudinal branch mounted to the at least one external wall and at least one radial branch connecting said at least one external longitudinal branch and the at least one internal longitudinal branch of the at least one sealing member.

8. The external nozzle member according to claim 1, wherein the at least one nozzle flange comprises at least one internal longitudinal branch connected to the at least one upstream end, and the at least one internal longitudinal branch of the at least one nozzle flange connected to at least one external longitudinal branch of the at least one nozzle flange via at least one radial branch.

9. The external nozzle member according to claim 8, wherein the at least one external longitudinal branch of the at least one nozzle flange and the at least one radial branch are angled with respect to one another.

10. The external nozzle member according to claim 8, wherein the at least one external longitudinal branch of the at least one nozzle flange extends from the at least one radial branch.

11. The external nozzle member according to claim 8, wherein the at least one external longitudinal branch of the at least one nozzle flange is connected to an external longitudinal branch of the sealing member.

12. The external nozzle member according to claim 8, wherein the at least one internal longitudinal branch of the at least one nozzle flange is separated from the at least one internal longitudinal branch of the at least one sealing member by a longitudinal air gap.

13. The external nozzle member according to claim 8, wherein the at least one radial branch of the at least one nozzle flange is separated from at least one radial branch of the at least one sealing member by a radial air gap.

14. A turbomachine assembly having the external nozzle member according to claim 1, said turbomachine assembly comprising at least one primary stream configured to conduct a primary flow from upstream to downstream, at least one annular cavity in which a cooling air flow circulates, at least one turbine casing mounted upstream of the external nozzle member, and at least one turbine casing flange extending downstream of the turbine casing and secured to the at least one nozzle flange.

15. The turbomachine assembly according to claim 14, wherein the at least one internal longitudinal branch of the at least one sealing member is separated from the at least one turbine casing flange by a calibrated mounting clearance.

16. A method for mounting the turbomachine assembly according to claim 14, said mounting method comprising:
attaching the upstream end of the at least one nozzle flange to the at least one turbine casing flange.

17. An external nozzle member for a turbomachine that extends longitudinally along an axis oriented from upstream to downstream, said external nozzle member comprising:
an acoustic attenuation panel comprising an acoustic attenuation structure having an internal face and an external face;
an internal wall mounted to the internal face of the acoustic attenuation structure;
an external wall mounted to the external face of the acoustic attenuation structure;
a nozzle flange mechanically coupled to the acoustic attenuation panel, said nozzle flange comprising an upstream end configured to be connected to a turbine casing flange of the turbomachine;
a sealing member mechanically coupled to the acoustic attenuation panel, said sealing member comprising a longitudinal branch;
wherein the longitudinal branch of the sealing member is in contact with the nozzle flange so as to thermally protect the nozzle flange from a primary flow through the turbomachine, the nozzle flange being made of a first material and the sealing member being made of a second material; and
wherein the first material has a first coefficient of thermal expansion, the second material has a second coefficient of thermal expansion, and wherein the first coefficient of thermal expansion is greater than the second coefficient of thermal expansion.

18. The external nozzle member of claim 17, wherein the sealing member is mechanically coupled to the acoustic attenuation panel.

19. The thermal external nozzle member of claim 17, wherein the upstream end of the nozzle flange comprises an attachment branch angled with respect to a longitudinal branch of the nozzle flange.

20. The thermal external nozzle member of claim 17, wherein the sealing member has a surface, wherein the nozzle flange has a surface, wherein a first part of the surface of the sealing member contacts a first part of the surface of the nozzle flange, and wherein a second part of the surface of the sealing member is spaced from a second part of the surface of the nozzle flange by an air gap.

* * * * *